Sept. 27, 1932.  C. A. PALMER ET AL  1,879,451

METHOD OF AND APPARATUS FOR FILTERING OIL

Filed May 1, 1930

Inventors
Clarence A. Palmer
Edward Lenke
By Bates, Golrick & Teare
Attorneys

Patented Sept. 27, 1932

1,879,451

UNITED STATES PATENT OFFICE

CLARENCE A. PALMER AND EDWARD LENKE, OF AKRON, OHIO, ASSIGNORS TO THE BURT MANUFACTURING COMPANY, OF AKRON, OHIO, A CORPORATION OF OHIO

METHOD OF AND APPARATUS FOR FILTERING OIL

Application filed May 1, 1930. Serial No. 448,856.

This invention relates to a method and apparatus for filtering oil, and more particularly to a method of and apparatus for treating dirty crank case oil and other lubricating oils in such a manner that the filtered product will be suitable for further use as a lubricant or as fuel oil for oil burners.

The principal object of our invention is to provide a method of and apparatus for filtering oil, which will efficiently and economically filter used lubricating oils and produce a clean oil which may be used as a lubricant or as a fuel oil. Another object of our invention is to produce a filter which will occupy a minimum of space, and which will handle a large volume of oil. Another object is to provide a filter which will require a minimum of attention and cleaning, and which may easily be cleaned if cleaning is necessary. A further object is to produce a filter having a long life and in which the cost of upkeep will be very small. A further object is to provide a method of filtering and a filter which can easily be adapted for use with various types of oils.

Further objects and advantages of our invention will appear from the following description of a preferred form thereof, reference being made to the accompanying drawing. The essential characteristics are summarized in the claims.

Figure 1:
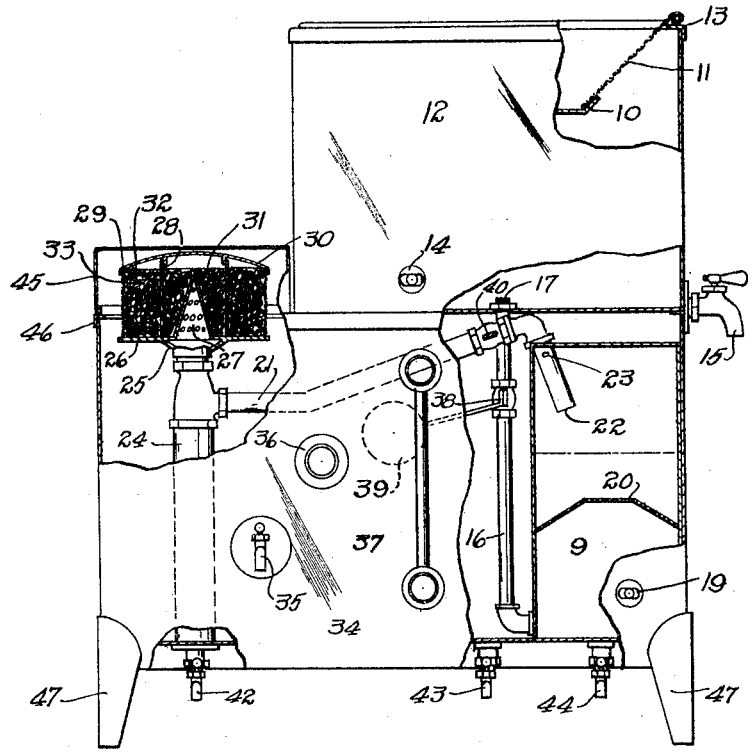
Figure 2:
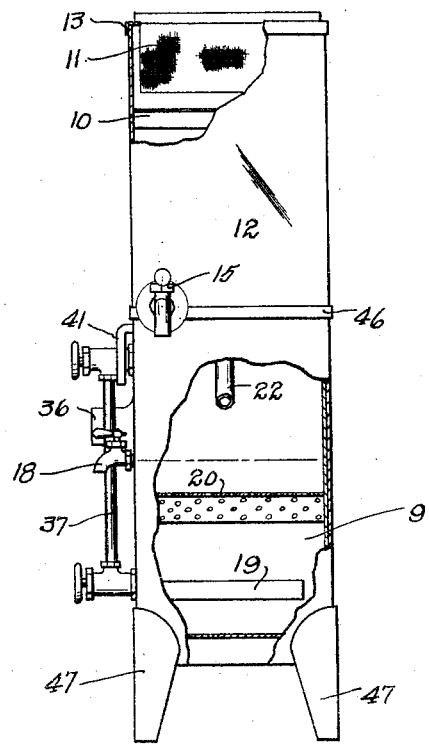

Referring now to the drawing: Fig. 1 is a front elevation partially broken away, showing a filter made according to our invention; and Fig. 2 is an end view partially broken away.

One of the difficulties heretofore encountered in connection with oil filters has been that the filtering medium has become clogged with foreign material, and frequent replacement and cleaning was required. Accordingly, our invention contemplates a process of filtering and a filter in which a large percentage of the foreign matter is removed from the oil before the oil reaches the filtering medium, thus doing away with a great deal of the cleaning necessary in previous types of filters, and assuring continuous operation of the filter without shut-downs necessitated by the clogging of the filter. In order to accomplish this result, we have provided four separate settling chambers through which the oil must pass before it reaches the filtering medium. Our invention also contemplates a filter in which the oil is forced through the filter by the action of gravity, and in which there are practically no moving parts.

Briefly, a filter made according to our invention, comprises a primary settling pan into which the oil is first poured. From this settling pan the oil flows through a comparatively coarse primary screen into a dirty oil reservoir, where the sediment again has an opportunity to settle out. A pipe leads from a point slightly above the bottom of this reservoir to an air tight precipitation chamber, in which the oil is allowed to flow upwardly through water, which removes more of the impurities. The partially emulsified oil gathers on the surface of the water and is drawn off at a point about midway between the top of the oil and the top of the water. From the precipitation chamber the oil flows to the filter unit proper, and immediately below the filter unit a sediment pipe is disposed, which is adapted to collect any water and foreign matter which may settle out of the oil. The oil flows from the center of the filter unit outwardly through a screen, cotton waste, bone black and finally through a layer of filter cloth. The filtered oil is collected in a clean oil reservoir and may be drawn off from time to time.

The filter unit is removable and may easily be replaced. Convenient drains and valves are provided, so that cleaning of the filter is a simple operation, and the ordinary draining off of the sludge may be accomplished without stopping the operation of the filter.

Referring in detail to the drawing, the primary settling pan is indicated at 10. A primary screen 11 may be formed as a unit with the settling pan, and both the screen, and the pan may be supported by the upper edges of the dirty oil reservoir 12, as at 13. When required, and particularly if heavy oils are used, the dirty oil reservoir may be provided with steam, hot water or electric heating unit, indicated generally at 14. A valve 15 may be provided to draw off any sludge which may accumulate in the dirty oil reservoir.

To carry off the oil from the dirty oil reservoir, and into the precipitation chamber, a pipe 16 having an opening 17 above the bottom of the dirty oil reservoir, may be provided. The pipe may lead into the bottom of an air tight precipitation chamber, 9, which chamber may be filled with water to the level of the over-flow drain valve 18, and the water and oil may be heated by a heating unit 19 which may be equipped for hot water, steam, electric or other convenient method of heating. The oil flows upwardly through the water in the precipitation chamber and may be distributed evenly through the water by a perforated baffle 20. Thus the oil is thoroughly mixed with the water and all water soluble substances are removed. The oil, which may be in a foamy and emulsified condition, will gather on the surface of the water within the chamber.

To convey the oil from the precipitation chamber to the filter unit, a pipe 21 may be provided, which enters the precipitation chamber near the top thereof, and has an end 22 opening at a point about midway between the level of the water and the top of the chamber. As the chamber is air-tight, an air vent 23 may be provided in the tube, in order to allow the oil to rise nearly to the top of the chamber and thus a more settled oil will flow into the pipe through the opening 22. The pipe 21 may lead to a sediment pipe 24, which is disposed directly below the filter unit. The force of gravity of the oil in the dirty oil chamber causes it to flow through the precipitation chamber and into the pipe 21 and the sediment pipe 24 and then upwardly through the filter unit. Any sediment still remaining in the oil has an opportunity to settle in the pipe 24.

The final purification of the oil takes place in the filtering unit which may be removably mounted on the pipe 24 by a flanged tubular member 25, to which is secured a substantially circular plate 26. The plate supports screens 27, 28 and 29, and the top of the filter unit may be closed by a cap 30. The oil flows outwardly through the screen 29, then through a layer of cotton waste 31, then through the screen 28, and the bone black 32, and is finally cleaned by the screen 29 and the filter cloth 33. The oil then drips downwardly into the clean oil reservoir 34 and may be drawn off as required through the valve 35 or through piping secured to the outlet 36.

The dirty oil reservoir may be supported by the clean oil reservoir and the precipitation chamber and the various pipes and valves may be disposed within the clean oil reservoir, thus forming a compact filter which will present a neat appearance. A glass gauge 37 may be provided to indicate the height of the oil in the clean oil chamber. When the oil has reached a predetermined height in the clean oil chamber, we have provided a valve 38 in the pipe 16, which may be controlled by a float 39. Also, the flow of oil from the precipitation chamber to the filter unit may be regulated by a valve 40 in the pipe 21, which may be regulated by an operating handle 41, extending through the wall of the clean oil reservoir.

The sludge may be easily drawn off by means of the drain valves 42, 43 and 44, which are disposed at the bottoms of the sediment pipe, clean oil reservoir, and precipitation chamber, respectively. In order to facilitate the cleaning of the filter unit, we have provided a detachable cap 45, which may be held in place directly above the filter unit by an upwardly extending flange on the clean oil reservoir, as at 46, and which may be easily removed and the filter cleaned or replaced. We prefer to support the entire filter slightly above from the floor by means of legs 47.

From the foregoing description of a preferred form of my invention, it will be seen that we have provided a compact and economical method of filtering oil, in which most of the foreign matter is removed from the oil before the filtering medium proper is reached. It will also be seen that we have provided an extremely simple filter, which has no moving parts with the exception of valves; which will require a minimum of attention and cleaning; and in which the infrequent cleaning required may be accomplished very easily and with little loss of time.

We claim:

1. In an oil filter, the combination of a primary settling pan into which the oil is first poured, a coarse screen associated therewith, a dirty oil reservoir disposed below said pan and screen, said pan and screen being removably mounted on said reservoir, a precipitation chamber disposed at a lower level than the reservoir, a tube for conveying oil from the bottom of the reservoir to the bottom of the chamber, a perforated baffle within the chamber, an outlet pipe having a vent therein disposed in the upper part of the chamber, and leading to a sediment pipe, a filter unit disposed directly above said sediment pipe and in communication therewith, and a clean oil reservoir adapted to receive the oil flowing from the filter unit.

2. An oil filter comprising in combination a clean oil reservoir, a dirty oil reservoir disposed directly above the clean oil reservoir, a primary settling pan having a screen associated therewith, removably mounted on the dirty oil reservoir, a precipitation chamber formed adjacent the clean oil reservoir, a tube leading from the dirty oil reservoir to the precipitation chamber and disposed within the clean oil reservoir, a tube leading from the precipitation chamber to a sediment pipe disposed within the clean oil reservoir, a filter unit detachably mounted on the sediment pipe at a level above the level of oil in the clean oil reservoir, and a detachable cap adapted to cover said filter unit.

3. An oil filter comprising in combination a clean oil reservoir, a dirty oil reservoir disposed directly above the clean oil reservoir, a primary settling pan having a screen associated therewith, removably mounted on the dirty oil reservoir, a precipitation chamber formed adjacent the clean oil reservoir, a tube leading from the dirty oil reservoir to the precipitation chamber and disposed within the clean oil reservoir, a tube leading from the precipitation chamber to a sediment pipe disposed within the clean oil reservoir and a filter unit detachably mounted on the sediment pipe at a level above the level of oil in the clean oil reservoir.

4. In an oil filter, the combination of a clean oil reservoir, a dirty oil reservoir positioned above the clean oil reservoir and supported thereby, a precipitation chamber formed in the clean oil reservoir and adapted to be partially filled with water, a tube leading from the dirty oil reservoir to the bottom of the precipitation chamber a perforated baffle disposed within the precipitation chamber and below the level of water therein, whereby the oil flowing into the precipitation chamber will be distributed through the water, and an outlet pipe extending downwardly into said precipitation chamber in the upper portion thereof, said outlet pipe having an open end disposed at a point substantially midway between the level of water and the top of the precipitation chamber, and having a vent at a point near the top of the precipitation chamber, whereby the oil may rise above the open end of the pipe.

5. In an oil filter, an air-tight precipitation chamber, adapted to contain water, a pipe for supplying oil to the bottom of said precipitation chamber, whereby the oil will flow upwardly through the water and gather on the surface thereof, a pipe for removing oil gathered on the surface of the water, said pipe having an end opening at a point substantially midway between the surface of the water and the top of the chamber, and having a vent at a point near the top of the chamber, whereby the oil may rise above the open end of the pipe.

6. In an oil filter, the combination of a primary settling pan, adapted to first receive the dirty oil, a screen associated therewith, a dirty oil reservoir disposed below said pan and screen, a precipitation chamber disposed at a lower level than the reservoir, a tube for conveying oil from the bottom of the reservoir to the bottom of the chamber, an outlet pipe disposed in the upper part of the chamber and leading to a sediment pipe, and a filter unit disposed directly above said sediment pipe and in communication therewith.

7. In an oil filter, the combination of a clean oil reservoir, a sediment pipe mounted therein, a filtering unit removably mounted on said sediment pipe and a detachable cap surrounding said filtering unit and supported by said clean oil reservoir.

In testimony whereof, we hereunto affix our signatures.

CLARENCE A. PALMER.
EDW. LENKE.